(12) United States Patent
Kim et al.

(10) Patent No.: US 10,609,191 B2
(45) Date of Patent: Mar. 31, 2020

(54) ELECTRONIC DEVICE INCLUDING GLASS

(71) Applicant: Samsung Electronics Co., Ltd, Suwon-si (KR)

(72) Inventors: Jung Hyun Kim, Suwon-si (KR); Kyung Min Kwak, Gumi-si (KR); Hyoung Do Heo, Gumi-si (KR); Jong Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/941,693

(22) Filed: Mar. 30, 2018

(65) Prior Publication Data

US 2019/0158641 A1 May 23, 2019

(30) Foreign Application Priority Data

Nov. 17, 2017 (KR) .......................... 10-2017-0153708

(51) Int. Cl.
*H04M 1/02* (2006.01)
*B32B 17/06* (2006.01)
*H04N 5/225* (2006.01)

(52) U.S. Cl.
CPC .......... *H04M 1/0264* (2013.01); *B32B 17/06* (2013.01); *H04M 1/0266* (2013.01); *H04N 5/2253* (2013.01); *H04N 5/2254* (2013.01); *B32B 2457/20* (2013.01)

(58) Field of Classification Search
CPC .... H04M 1/0264; H04M 1/0266; B32B 17/06
See application file for complete search history.

(56) References Cited

U.S. PATENT DOCUMENTS

| 9,507,382 B2 | 11/2016 | Lee et al. | |
|---|---|---|---|
| 2011/0188180 A1* | 8/2011 | Pakula | G06F 1/1626 361/679.01 |
| 2012/0275088 A1* | 11/2012 | Huang | B05D 5/10 361/679.01 |
| 2014/0152890 A1* | 6/2014 | Rayner | G06F 1/1626 348/376 |
| 2015/0055292 A1* | 2/2015 | Lee | G06F 1/1656 361/679.55 |
| 2017/0358611 A1* | 12/2017 | Evans, V | G06F 1/1605 |

(Continued)

FOREIGN PATENT DOCUMENTS

KR 10-2015-0023995 A 3/2015

OTHER PUBLICATIONS

Samsung Newsroom, "Samsung Galaxy Unpacked 2017 Offers Unconfined Mobile Experience with Galaxy S8", Mar. 30, 2017, 10 pages.

*Primary Examiner* — Hoa C Nguyen
*Assistant Examiner* — Keith DePew

(57) ABSTRACT

According to an embodiment, an electronic device and a glass plate forming at least half of one side of an electronic device are disclosed. The electronic device includes a camera disposed below the glass plate. The glass plate includes an outer surface facing a first direction. The glass plate also includes an inner surface facing a second direction opposite to the first direction. The least one of the outer surface and the inner surface includes a first portion where at least a part of a lens of the camera is exposed, and the first portion includes a different curvature from a peripheral portion around the first portion.

16 Claims, 17 Drawing Sheets

(56) References Cited

U.S. PATENT DOCUMENTS

| | | | | |
|---|---|---|---|---|
| 2017/0358612 A1* | 12/2017 | Evans, V | .............. | G06F 1/1605 |
| 2018/0126704 A1* | 5/2018 | Zhang | ..................... | C03C 15/00 |
| 2018/0373370 A1* | 12/2018 | Jung | ..................... | G06F 3/0412 |

* cited by examiner

POLISHING PROCESS 240

ELECTRONIC DEVICE INCLUDING GLASS

CROSS-REFERENCE TO RELATED APPLICATION(S)

The present application is related to and claims priority to Korean Patent Application No. 10-2017-0153708 filed on Nov. 17, 2017, the entire disclosure of which is hereby incorporated by reference.

TECHNICAL FIELD

Embodiments disclosed herein relate to an electronic device including glass.

BACKGROUND

In recent years, electronic devices have employed curved glass (curved windows). Curved glass may be applied to a display of an electronic device to expand an active area of the display or to make a user feel like the active area of the display expands.

SUMMARY

A process of manufacturing curved glass may include a hot forming process for bending flat glass. The hot forming process may include, for example, a process of forming a curved region in a window by applying pressure to flat glass placed on a first mold using a second mold. The curved region of the window may form a bent region on at least one of a front side, a rear side, and a lateral side of an electronic device. In this process, mold marks may cause a glass defect on at least a portion of a surface of the window. For example, if a portion of glass through which at least some lenses of a camera are exposed has a glass defect (e.g., a scratch), external light may not be evenly input to the camera, and thus the resolution of the camera may be degraded.

Aspects of the present disclosure are to address at least the above-mentioned problems and/or disadvantages and to provide at least the advantages described below. According to this disclosure, it is an object to provide an electronic device having glass applied thereto to reduce a glass defect on a portion through which at least some lenses of a camera are exposed.

In accordance with an aspect of the present disclosure, an electronic device includes a front plate including a glass plate that includes an outer surface facing a first direction and an inner surface facing a second direction opposite to the first direction, a rear plate including an external surface facing the second direction, a side member that surrounds a space between the front plate and the rear plate and is integrally formed with or attached to the rear plate, an imaging device exposed through a first portion of the front plate, and a display exposed through a second portion of the front plate when viewed from above the outer surface. The first portion is located between the second portion and the side member when viewed from above the outer surface, and the glass plate includes, on the first portion, at least one of a first protrusion protruding from the outer surface in the first direction and a second protrusion protruding from the inner surface in the second direction.

In accordance with another aspect of the present disclosure, an electronic device includes a glass plate that forms more than half of one side of the electronic device and a camera disposed below the glass plate. The glass plate includes an outer surface facing a first direction and an inner surface facing a second direction opposite to the first direction. At least one of the outer surface and the inner surface has a first portion through which at least a part of lenses of the camera is exposed, and the first portion has a different curvature from a peripheral portion around the first portion.

In accordance with another aspect of the present disclosure, a glass plate forming more than half of one side of an electronic device including a camera includes an outer surface facing a first direction and an inner surface facing a second direction opposite to the first direction. At least one of the outer surface and the inner surface has a first portion through which at least a part of lenses of the camera is exposed, and the first portion has a different curvature from a peripheral portion around the first portion.

According to embodiments disclosed herein, camera resolution may be improved by reducing a scratch on a portion of glass through which at least some lenses of a camera are exposed.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
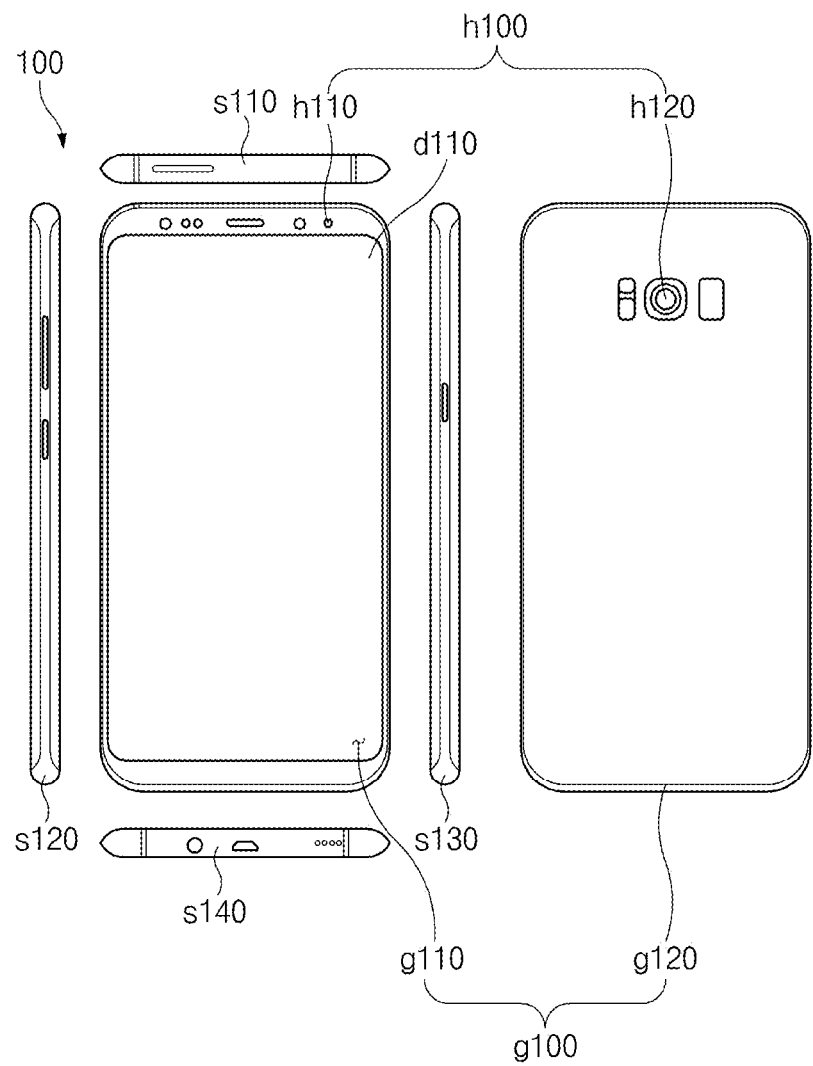
FIG. 1 illustrates six orthogonal views of an electronic device according to an embodiment.

FIG. 1 illustrates six orthogonal views of an electronic device according to an embodiment.

Referring to FIG. 1, according to an embodiment, a housing of an electronic device 100 may include a plurality of surfaces. The plurality of surfaces may include a first surface g110 (e.g., a front plate), a second surface g120 (e.g., a rear plate), a third surface s110 (e.g., an upper side surface), a fourth surface s120 (e.g., a left side surface), a fifth surface s130 (e.g., a right side surface), and a sixth surface s140 (e.g., a lower side surface).

According to an embodiment, the first surface g110 may form a front side of the electronic device 100. The second surface g120 may form a rear side of the electronic device 100. At least one of the first surface g110 and the second surface g120 may form, for example, at least a portion of a lateral side of the electronic device 100.

According to an embodiment, at least one of the first surface g110 and the second surface g120 may include curved glass formed by bending flat glass. For example, the first surface g110 or the second surface g120 may at least partly include a flat region or a curved region. The curved region may be directed toward the lateral side of the electronic device 100 and may have at least one curvature. The flat region and the curved region may be connected with each other. Hereinafter, in this disclosure, it will be exemplified that both the first surface g110 and the second surface g120 are implemented with curved glass.

According to an embodiment, the electronic device 100 may include the housing that includes the first surface (or the front plate) g110, the second surface (or the rear plate) g120, and the side surfaces s110, s120, s130, and s140 that surround a space between the first surface g110 and the second surface g120. In another embodiment (not illustrated), the housing may also refer to a structure that includes some of the first surface g110, the second surface g120, and the side surfaces s110, s120, s130, and s140. According to an embodiment, at least a portion of the first surface g110 may be formed of a substantially transparent front plate (e.g., a glass plate including various coating layers, or a polymer plate). The second surface g120 may be formed of a substantially opaque rear plate. The rear plate may be formed of, for example, coated or colored glass, ceramic, polymer, metal (e.g., aluminum, stainless steel (STS), or magnesium), or a combination of two or more thereof. The side surfaces s110, s120, s130, and s140 may be connected with the front plate and the rear plate and may be implemented with a lateral bezel structure (or a "lateral member") including metal and/or polymer. In an embodiment, the rear plate and the lateral bezel structure may be integrally formed with each other and may include the same material (e.g., metal, such as aluminum).

According to an embodiment, at least one of the first surface g110, the second surface g120, the third surface s110, the fourth surface s120, the fifth surface s130, and the sixth surface s140 may have an opaque color so that internal elements of the electronic device 100 are not visible from the outside. For example, the first surface g110 and the second surface g120 may have an opaque layer coated on or attached to at least a portion thereof, and the internal elements of the electronic device 100 may be hidden by the opaque layer. In another example, the third surface s110, the fourth surface s120, the fifth surface s130, and the sixth surface s140 may be formed of an opaque color material.

According to an embodiment, some (e.g., a display, a camera lens, and the like) of the internal elements of the electronic device 100 may be exposed to the outside through at least one of the first surface g110, the second surface g120, the third surface s110, the fourth surface s120, the fifth surface s130, and the sixth surface s140. For example, in the case where the electronic device 100 has cameras h110 and h120 provided on the front and rear sides thereof, the first surface g110 and the second surface g120 may include a first portion h100 through which a camera hole is exposed. The camera hole may be a hole through which at least some lenses included in a lens assembly of a camera are exposed. In another example, the first surface g110 may include a second portion d110 through which a display is exposed. Since the second portion d110 of the glass does not include an opaque layer, the display may be exposed through the second portion d110.

Figure 2:
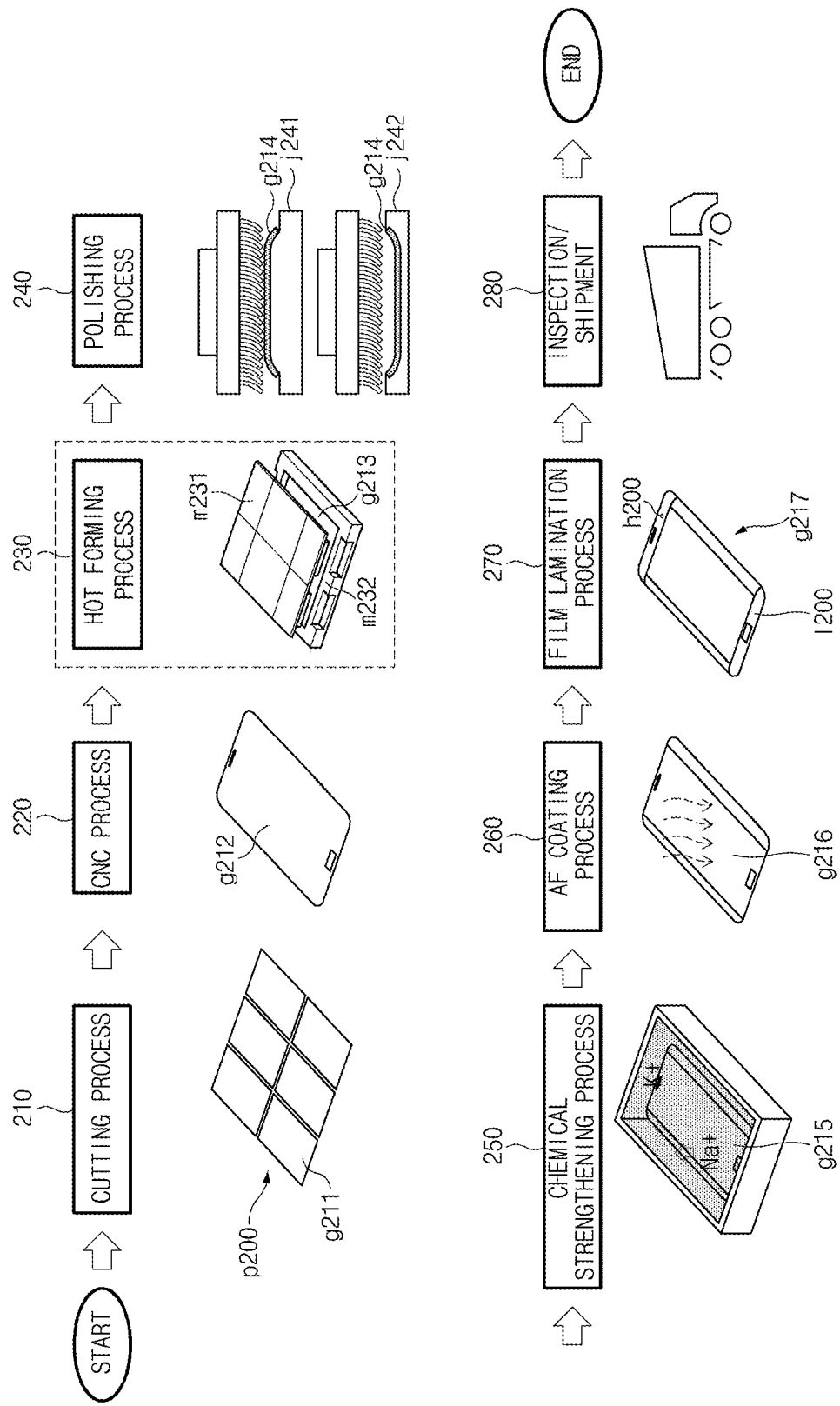
FIG. 2 illustrates a flow diagram of a method for manufacturing a curved glass plate, according to an embodiment of the present disclosure.
Figure 3A:
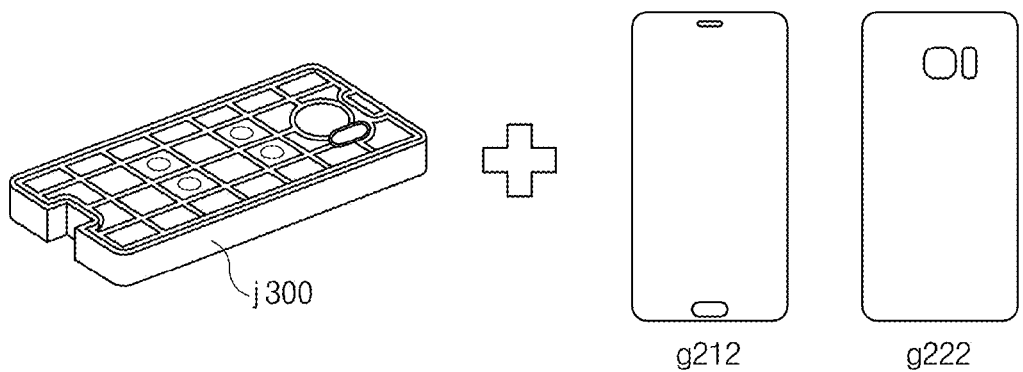
FIG. 3A illustrates a detailed view of a CNC process according to an embodiment of the present disclosure.
Figure 3B:
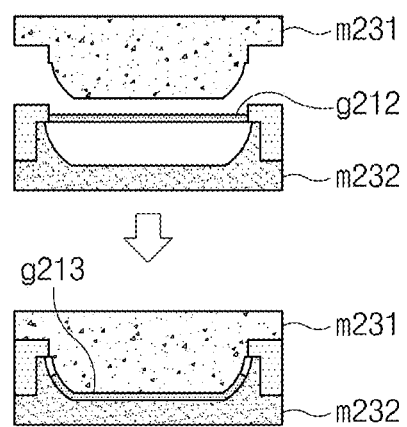
FIG. 3B illustrates a detailed view of a hot forming process according to an embodiment of the present disclosure.
Figure 3C:
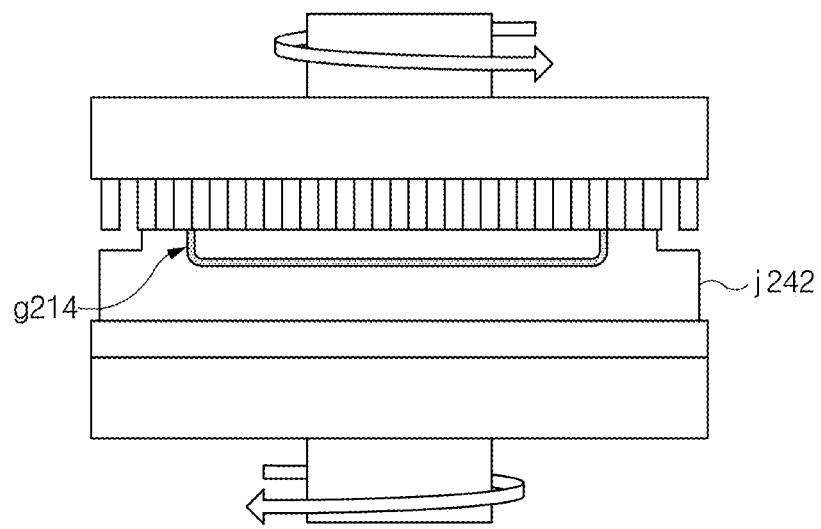
FIG. 3C illustrates a detailed view of a polishing process according to an embodiment of the present disclosure.

FIG. 2 illustrates a flow diagram illustrating a method for manufacturing a curved glass plate, according to an embodiment of the present disclosure. FIG. 3A illustrates a CNC process according to an embodiment of the present disclosure. FIG. 3B illustrates a hot forming process according to an embodiment of the present disclosure. FIG. 3C illustrates a polishing process according to an embodiment of the present disclosure. A process of manufacturing a front glass plate will be described below with reference to FIGS. 2 to 3C.

Referring to FIGS. 2 to 3C, in process 210 (a cutting process), a mother plate p200 may be cut into separate glass members g211 having a first shape and a first size. The mother plate p200 may be, for example, a glass plate or a synthetic resin plate. The first shape may be, for example, a rectangular shape. The first size may be, for example, larger than or equal to the size of a front side of an electronic device (e.g., the electronic device 100 of FIG. 1).

In process 220 (a computer numerical control (CNC) process), while each separate glass member g211 is mounted on a specified jig j300, edge profiling and punching may be performed on the separate glass member g211 to form a flat glass plate g212. The CNC process may be, for example, a drilling process for performing edge profiling and punching. The edge profiling may include machining corners of the separate glass member g211 in a second shape and in a second size. The second shape may be, for example, a rectangular shape with a round corner. The second size may be, for example, smaller than the first size. The punching may include making a hole at a specified position in the flat glass plate g212.

Referring to FIG. 3A, the jig j300 may include a recess or hole at a position corresponding to the position at which a hole is to be formed in the separate glass member g211 through punching. While the separate glass member g211 is placed on the jig j300, a CNC machine may cut away the edge from the separate glass member g211 and may punch a hole in the separate glass member g211 to form the flat glass plate g212. Referring to FIG. 3A, the jig 300 may be used to form the flat glass plate g212 that forms a first side of the electronic device 100 or a flat glass plate g222 that forms a second side of the electronic device 100. Referring to FIG. 2, in process 230 (a hot forming process), a curved glass plate g213 may be formed by bending the flat glass plate g212 by applying pressure to the flat glass plate g212 in a first direction at high temperature by using a first mold m231 and a second mold m232. The first direction may be, for example, a direction from the first mold m231 to the second mold m232. For example, the first mold m231 may be one of an upper mold and a lower mold, and the second mold m232 may be the other of the upper mold and the lower mold. One of the first mold m231 and the second mold m232 may have a convex shape, and the other may have a concave shape. For example, as illustrated in FIG. 3B, the upper mold m231 may have a convex shape, and the lower mold m232 may have a concave shape.

Referring to FIG. 3b, while the flat glass plate g212 is placed on an upper end of the second mold m232, pressure may be applied to the flat glass plate g212 in the first direction at high temperature by using the first mold m231. The flat glass plate g212 may be gradually bent in the first direction by the pressure of the first mold m231. As the flat glass plate g212 is bent, the gap between the first mold m231 and the second mold m232 may reach a specified distance, and thus the curved glass plate g213 may be formed. According to an embodiment, the hot forming process may be performed at a temperature of 500 degrees Celsius to 800 degrees Celsius after preheating time has elapsed, and the curved glass plate g213, after being shaped, may be cooled to keep the shape thereof.

Referring to FIG. 2, in process 240 (a polishing process), surfaces of a curved glass plate g214 may be polished by using a brush. For example, the curved glass plate g214 may be polished by using a polishing brush while placed on at least one of a first jig j241 and a second jig j242. At least a part of marks made by the molds may be removed from the curved glass plate g214 in the polishing process. According to an embodiment, as illustrated in the upper drawing in process 240, an outer surface of the curved glass plate g214 may be polished by using the brush while the curved glass plate g214 is placed on the first jig j241 that supports an inner surface of the curved glass plate g214. In another example, as illustrated in the lower drawing in process 240 and FIG. 3C, the inner surface of the curved glass plate g214 may be polished by using the brush while the curved glass plate g214 is placed on the second jig j242 that supports the outer surface of the curved glass plate g214.

Referring to FIG. 2, in process 250 (a chemical strengthening process), the strength of a curved glass plate g215 may be increased by increasing surface compressive stress of the curved glass plate g215 through ion-exchange. For example, in the case where the curved glass plate g215 is formed of glass, the strengthened curved glass plate g215 may be obtained by forming a compressive stress layer on a surface of the glass (by chemically strengthening the surface of the glass) by replacing some of sodium ions on the surface of the glass with potassium ions.

In process 260 (an anti-fingerprint (AF) coating process), a coated curved glass plate g216 may be formed by coating an anti-fingerprint layer on a surface of the strengthened curved glass plate g215.

In process 270 (a film lamination process), a curved glass plate g217 may be formed by printing an opaque layer l200 on at least a portion of the coated curved glass plate g216. For example, the opaque layer l200 may be a layer for covering a region of the curved glass plate g217 that is not to be exposed outside the electronic device 100. The opaque layer l200 may be formed, for example, in a bezel area. The printing of the opaque layer l200 may be replaced with a process of coating a specified material on the curved glass plate g216. The opaque layer l200 may be formed to avoid a first portion h200 through which a part of the electronic device 100, for example, a camera hole is exposed.

In process 280 (an inspection/shipment process), good glass plates may be selected from the curved glass plates g217. An inspection may be performed on each curved glass plate g217 to identify a defect (e.g., a scratch) on the curved glass plate g217. A defect (e.g., a scratch defect) on the first portion h200 of the curved glass plate g217, which is above the camera hole, may lead to a failure in the camera. For example, a bad curved glass plate may have, on a surface thereof, a scratch (e.g., a repeated pattern) similar to an orange peel. The scratch may cause a variation in light incident on the camera to deteriorate the resolution of the camera. The deterioration in the camera resolution may lead to degradation in the definition of the camera. The curved glass plate according to an embodiment of the present disclosure may achieve a reduction in surface defects, thereby improving the resolution and definition of the camera.

As described above, a defect (e.g., a scratch) on the portion of the curved glass plate through which the camera hole is exposed may affect the resolution of the camera. The defect of the curved glass plate g217 may have a greater effect on the definition of a higher resolution camera.

Figure 4:
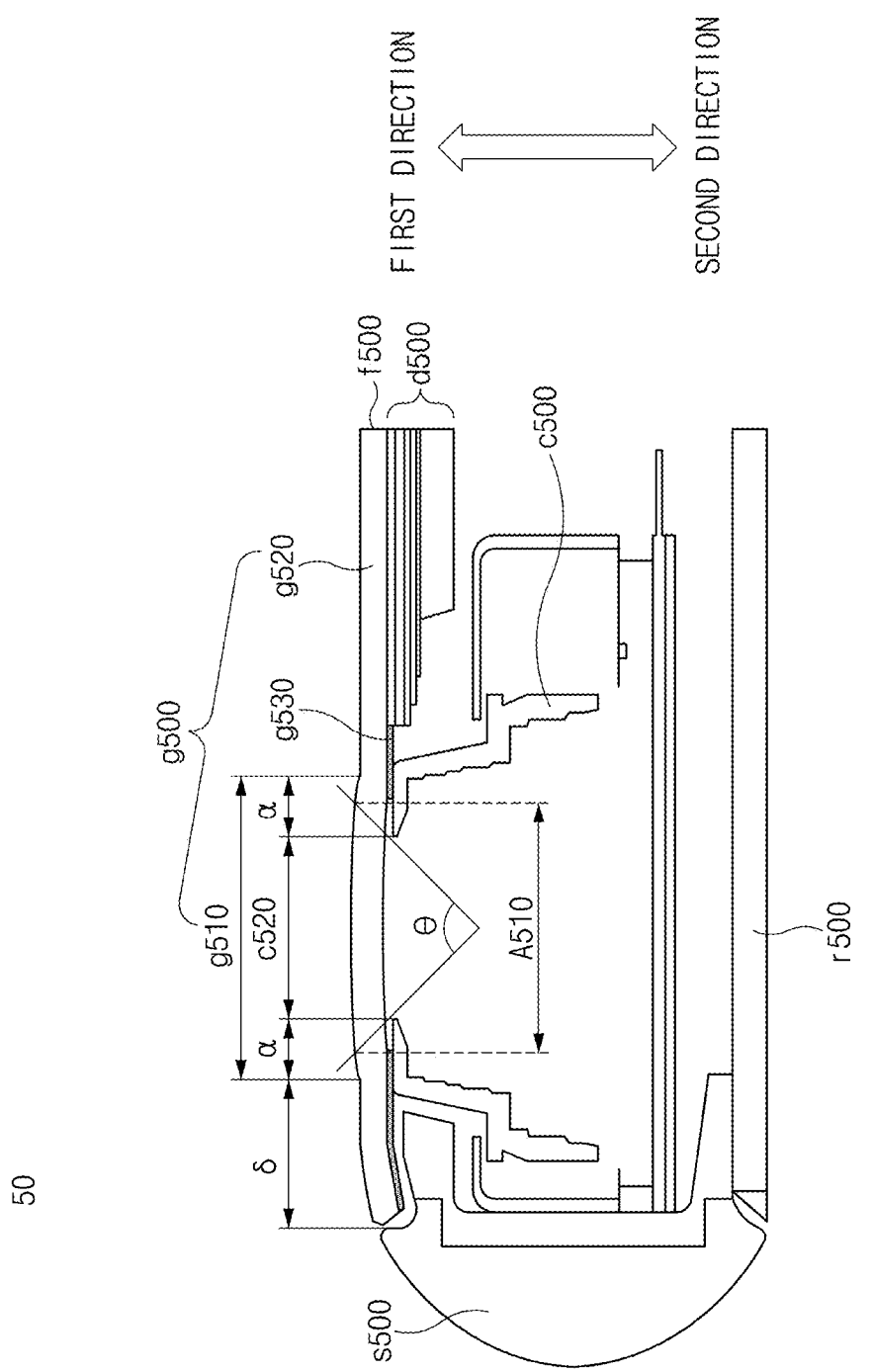
FIG. 4 illustrates a sectional view of a camera region of an electronic device, according to an embodiment of the present disclosure.
Figure 5:
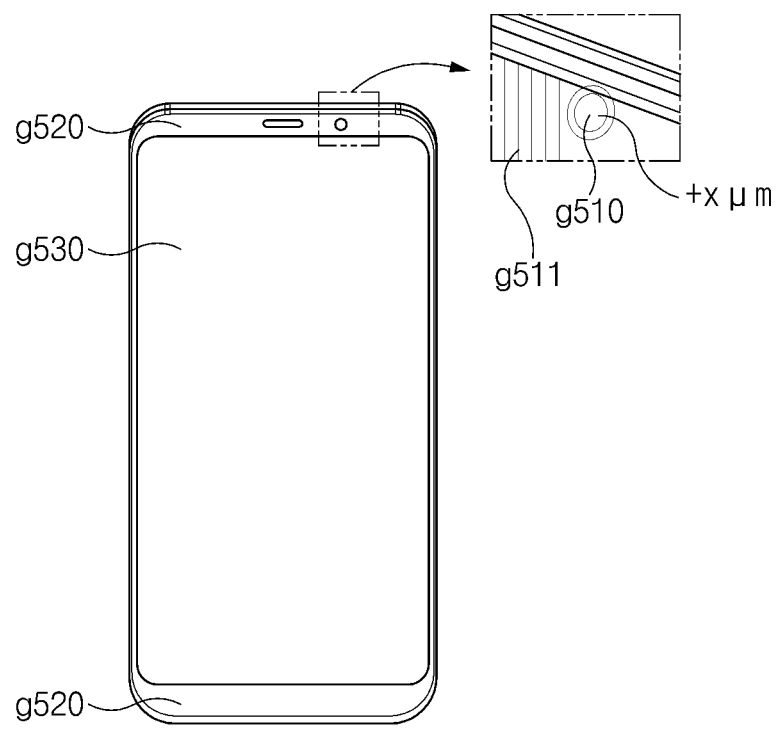
FIG. 5 illustrates a front view of an electronic device according to an embodiment of the present disclosure.

FIG. 4 illustrates a sectional view of a camera region of an electronic device, according to an embodiment of the present disclosure, and FIG. 5 illustrates a front view of an electronic device according to an embodiment of the present disclosure.

Referring to FIGS. 4 and 5, according to an embodiment, an electronic device 50 (e.g., the electronic device 100 of FIG. 1) may include a housing g500, r500, and s500, a display d500, and a camera c500. In an embodiment, some elements may be omitted, or additional elements may be further included. For example, the electronic device 50 may further include a processor (not illustrated) for controlling the display d500 and the camera c500. In an embodiment, some of the elements may be combined together to form one object, but the object may identically perform the functions of the corresponding elements before the combination. For the convenience of description, a lens of the camera c500, an image sensor, or the like is not illustrated in FIG. 4.

According to an embodiment, the housing g500, r500, and s500 may include a front plate f500, the rear plate r500, and the side member s500.

In an embodiment, the front plate f500 may include, for example, the glass plate g500. For example, more than half of the front plate f500 may be formed of the glass plate g500. In another example, the front plate f500 may be substantially the glass plate g500. In this disclosure, it will be exemplified that the glass plate g500 included in the front plate f500 and a lens included in the camera c500 overlap each other when viewed from above the front plate f500. The glass plate g500 may include an outer surface facing a first direction and an inner surface facing a second direction opposite to the first direction. The first direction may be, for example, a direction normal to the outer surface of the glass plate g500. The second direction may be, for example, a direction normal to the inner surface of the glass plate g500.

In an embodiment, the glass plate g500 may at least partly include a curved portion. In another example, the glass plate g500 may include a flat region and a curved region. The flat region may be, for example, a region facing the first direction of the electronic device 50. The curved region may be, for example, a region not facing the first direction (e.g., a region directed toward a plurality of side surfaces of the electronic device 50). For example, the curved region may be formed through a hot forming process of bending the flat region (see process 230 of FIG. 2).

In an embodiment, the rear plate r500 may include, for example, an outer surface facing the second direction. The rear plate r500 may be formed of, for example, an opaque synthetic resin. A camera hole of a rear camera may be exposed outside the electronic device 50 through a camera hole of the rear plate r500 that is formed to correspond to a camera hole of the camera c500.

In an embodiment, the side member s500 may surround a space between the front plate f500 and the rear plate r500. For example, the side member s500 may be integrally formed with, or attached to, the rear plate r500. In another example, the side member s500 may be combined with the rear plate r500 and the front plate f500 in an assembly process.

According to an embodiment, the display d500 may be exposed through a second portion g520 of the front plate f500 when viewed from above the outer surface of the glass plate g500. Examples of the display d500 may include a liquid crystal display (LCD), a light-emitting diode (LED) display, an organic light-emitting diode (OLED) display, and an electronic paper display. The display d500 may display, for example, various types of contents (e.g., text, an image, a video, an icon, a symbol, and/or the like) for a user. According to an embodiment, the display d500 may display an image (e.g., a live view image) obtained by using the camera c500 under instruction of the processor (not illustrated).

According to an embodiment, the camera c500 may be exposed through a first portion g510 of the glass plate g500. For example, the first portion g510 may be located between the second portion g520 of the glass plate g500 and the side member s500 when viewed from above the outer surface of the glass plate g500. The second portion g520 may be, for example, a region through which the display d500 is exposed. For example, the first portion g510 may be located in close proximity to the outermost surface (side region) of the side member s500 with less than a specified distance δ therebetween when viewed from above the outer surface of the electronic device. In another example, at least a portion of a camera hole (or a camera assembly hole) of the glass plate g500 may be exposed through the first portion g510. In the case where the glass plate g500 is a curved glass plate, the first portion g510 may be located, for example, in a flat region of the curved glass plate.

According to an embodiment, the camera c500 may include a lens assembly and an image sensor. The lens assembly may be configured such that the image sensor has a specified angle of view and a specified focal length. The image sensor may convert external light transmitted from an external object through the lens assembly into an electrical signal to obtain an image corresponding to the external object (e.g., a subject). The external light may be input to the lens assembly through the first portion g510 of the glass plate g500 and a camera hole c520. The image sensor may include, for example, a charged coupled device (CCD) sensor or a complementary metal oxide semiconductor (CMOS) sensor.

According to an embodiment, at least one of the outer surface and the inner surface of the glass plate g500 may have different curvatures in the first portion g510 and a peripheral portion around the first portion g510. The first portion g510 of the glass plate g500 may have at least one of a protrusion protruding in the first or second direction, a depression recessed in the second direction from the outer surface of the first portion g510, and a depression recessed in the first direction from the inner surface of the first portion g510.

According to an embodiment, at least one of the outer surface and the inner surface of the glass plate g500 may include a protrusion formed on the first portion g510. The protrusion may be formed, for example, by a pressing force applied to the glass plate g500 in the direction from the inner surface to the outer surface of the glass plate g500 (or in the first direction) in a hot forming process. For example, the first portion g510 of the glass plate g500 may include a protrusion formed such that the inner surface of the glass plate g500 is recessed in the first direction and the outer surface of the glass plate g500 protrudes in the first direction. For example, the protrusion may have a convex cross-section having a height (+x) ranging from a first value (e.g., 0.5 μm) to a second value (e.g., 3 μm) in the first direction from the outer surface of the glass plate g510 around the first portion g510. The inner surface of the glass plate g500 may have a recess formed on the first portion g510 of the glass plate g500 in the first direction. For example, the recess may have a concave cross-section having a depth ranging from the first value (e.g., 0.5 μm) to the second value (e.g., 3 μm) in the first direction from the inner surface around the first portion g510.

According to an embodiment, at least one of the outer surface and the inner surface of the glass plate g500 may have no repeated pattern (e.g., scratch) on the first portion g510 and may have a repeated pattern outside the first portion g510.

In an embodiment, the first portion g510 may include the camera hole c520 when viewed from above the outer surface of the glass plate g500. For example, in the case where the first portion g510 has a circular shape, the first portion g510 may have a radius larger than the radius of the camera hole c520 by at least a specified distance α. For example, the specified distance α may be set such that the width of the first portion g510 is larger than the width of a first region A510 depending on the angle of view of the camera c500. The first region A510 may be, for example, a virtual region generated when the angle of view (θ) of the camera c500 and the inner or outer surface of the glass plate g500 cross each other. For example, if the first region A510 has a circular shape with 3.48φ, the first portion g510 may have 4.5φ larger than the diameter of the first region A510 by 0.72 mm.

According to an embodiment, a third portion g530 of the glass plate g500 may be configured to cover an internal element (e.g., the processor) of the electronic device 50. For example, the third portion g530 of the glass plate g500 may have an opaque layer attached thereto or coated thereon. For example, the third portion g530 of the glass plate g500 may have different transparency than the first portion g510 and the second portion g520.

According to an embodiment, the glass plate g500 may also be applied to the rear side of the electronic device 50.

According to an embodiment, the glass plate g500 may include a protrusion in which the outer surface of the first portion g510 is recessed and the inner surface of the first portion g510 protrudes. For example, the protrusion may have a convex cross-section having a height (+x) ranging from the first value (e.g., 0.5 μm) to the second value (e.g., 3 μm) in the second direction from the inner surface of the glass plate g510 around the first portion g510. The outer surface of the glass plate g500 may have a recess formed on the first portion g510 of the glass plate g500 in the second direction. For example, the recess may have a concave cross-section having a depth ranging from the first value (e.g., 0.5 μm) to the second value (e.g., 3 μm) in the second direction from the outer surface around the first portion g510.

Figure 6:
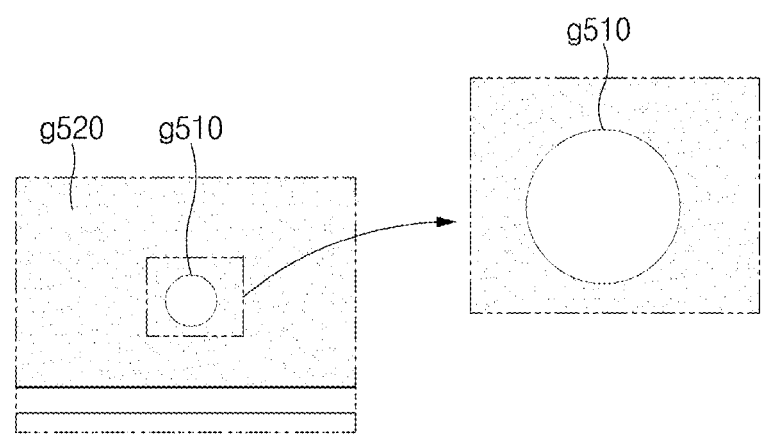
FIG. 6 illustrates a surface characteristic of a glass plate according to an embodiment of the present disclosure.

FIG. 6 illustrates a surface characteristic of a glass plate according to an embodiment of the present disclosure.

Referring to FIG. 6, according to an embodiment, since the first portion g510 (e.g., the first portion g510 of FIG. 4) of the glass plate g500 does not make direct contact with a mold (e.g., m231 or m232 of FIG. 2), or has less contact with the mold even though making contact with the mold, in a hot forming process for the glass plate g500, the first portion g510 may have less glass defect (e.g., scratch) than the periphery of the second portion g520. Since the first portion g510 is located in close proximity to the side member s500 (e.g., less than the specified distance δ of FIG. 4), the first portion g510 is likely to have a glass defect (e.g., scratch) due to external pressure in the hot forming process for the glass plate g500.

Figure 7A:
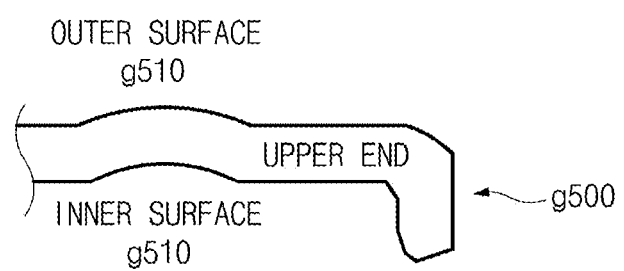
FIG. 7A illustrates a sectional view of an upper end of a glass plate that includes a first portion of the glass plate, according to an embodiment of the present disclosure.

FIG. 7A illustrates a sectional view of a portion of a glass plate that includes a first portion (e.g., g510 of FIG. 4) of the glass plate, according to an embodiment of the present disclosure.

Referring to FIG. 7A, a glass plate (e.g., the glass plate g500 of FIG. 4) may include a protrusion in which an inner surface of a first portion (e.g., the first portion g510 of FIG. 4) of the glass plate g500 is recessed and an outer surface of the first portion protrudes.

Figure 7B:
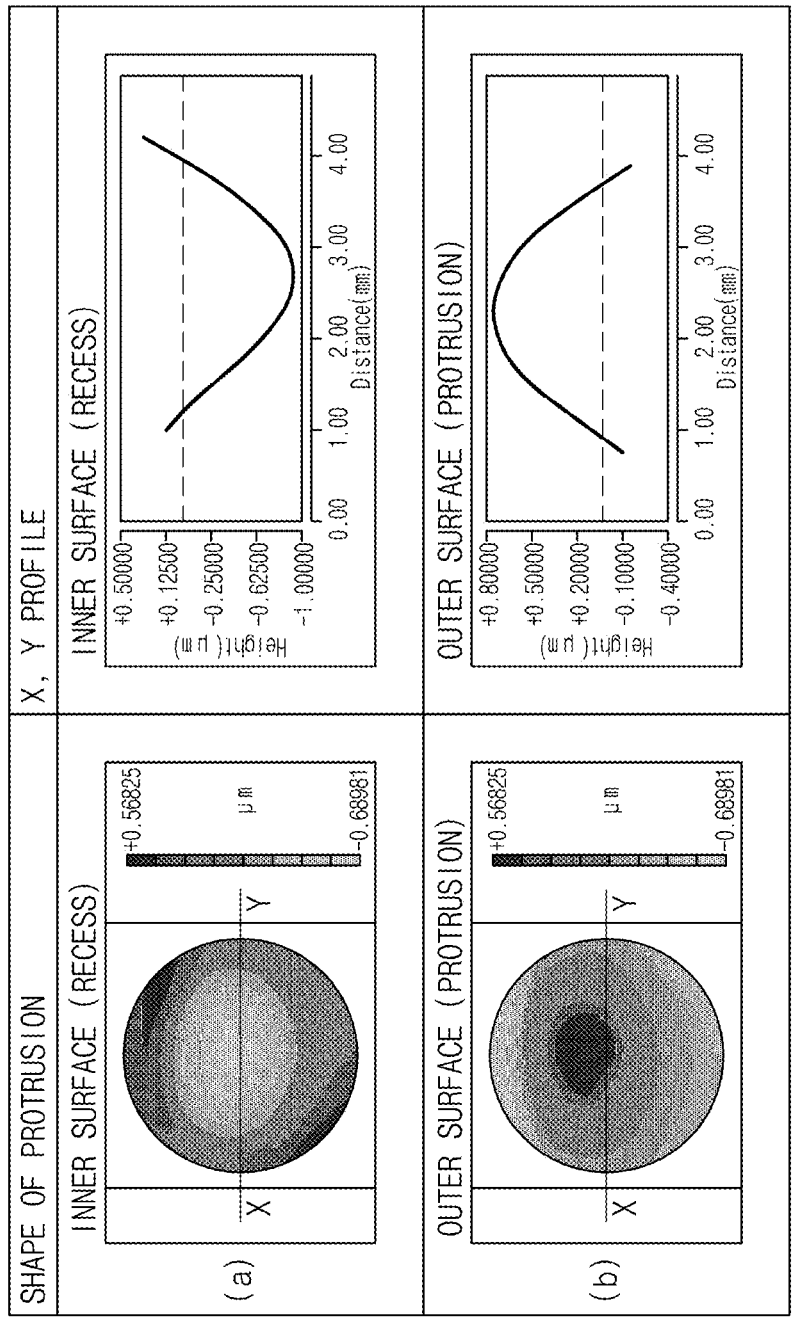
FIG. 7B illustrates measurement values of a zygo interferometer for a first portion of a glass plate according to an embodiment of the present disclosure.

FIG. 7B illustrates measurement values of a zygo interferometer for a first portion (e.g., the first portion g510 of FIG. 4) of a glass plate according to an embodiment of the present disclosure. In FIG. 7B, a first measurement value (a protruding shape) represents a relative height or depth of a protrusion in colors, and a second measurement value (X-Y profile) represents a variation in the height of the first portion on X- and Y-lines passing through the first portion of the glass plate.

Referring to FIG. 7B (a) (a measurement value for the inner surface of the glass plate g500), the inner surface of the first portion g510 of the glass plate g500 may have a concave shape, compared to the periphery of the first portion g510. As in a graph on the right side of FIG. 7B (a), the inner surface of the first portion g510 of the glass plate g500 may have an increasing depth toward the center of the first portion g510. For example, the first portion g510 of the glass plate g500 may have a depth ranging from −0.56822 μm to +0.68981 μm with respect to the average depth of the first portion g510 when viewed from above the inner surface of the glass plate g500.

Referring to FIG. 7B (b) (a measurement value for the outer surface of the glass plate g500), the outer surface of the first portion g510 of the glass plate g500 may have a convex shape, compared to the periphery of the first portion g510. As in a graph on the right side of FIG. 7B (b), the outer surface of the first portion g510 of the glass plate g500 may have an increasing height toward the center of the first portion g510. For example, the first portion g510 of the glass plate g500 may have a height ranging from −0.2146 μm to +0.7452 μm with respect to the average height of the first portion g510 when viewed from above the outer surface of the glass plate g500.

Hereinafter, the shape of a mold and a glass plate according to an embodiment will be described with reference to FIGS. 8A to 8C.

Figure 8A:
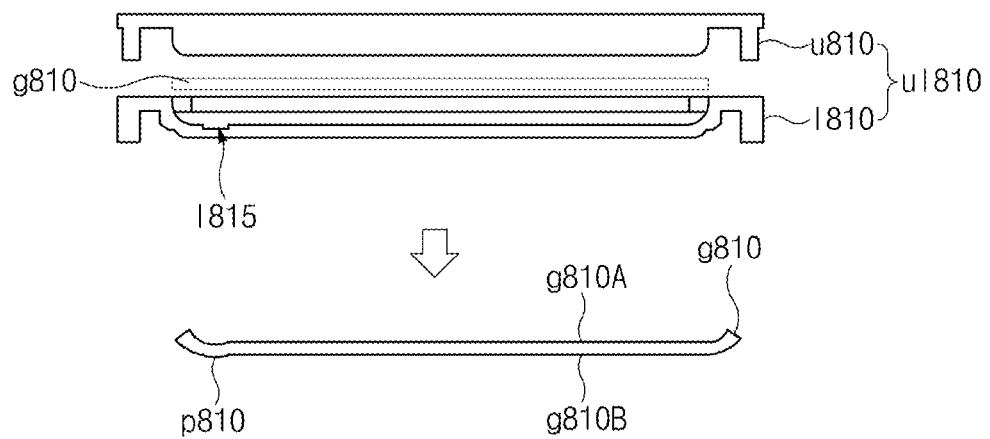
FIG. 8A illustrates a first mold set having a lower run-out groove and a glass plate formed by the first mold set, according to an embodiment of the present disclosure.

FIG. 8A illustrates a first mold set and a glass plate according to an embodiment of the present disclosure. The first mold set may be, for example, a mold set having a lower run-out groove.

Referring to FIG. 8A, according to an embodiment, a first mold set ul810 may include an upper mold u810 and a lower mold l810. The lower mold l810 may have a run-out groove l815 formed on an inner surface thereof, and the upper mold u810 may have no run-out groove formed thereon. For example, the run-out groove l815 may be formed on the inner surface of the lower mold l810 that corresponds to an outer surface of a first portion p810 of a glass plate g810. The run-out groove l815 may face the outer surface of the first portion p810 of the glass plate g810 in a hot forming process for the glass plate g810. Due to the run-out groove l815, the outer surface of the first portion p810 of the glass plate g810 may not make direct contact with the lower mold l810, or the area or pressure by which the first portion p810 makes contact with the lower mold l810 may be smaller than when the run-out groove l815 is not present.

According to an embodiment, the first portion p810 of the glass plate g810, which is formed by using the first mold set ul810, may have a protruding shape protruding from an outer surface g810B of the glass plate g810 and recessed inward from an inner surface g810A of the glass plate g810. The outer surface g810B of the glass plate g810 may be, for example, a surface of the glass plate g810 formed in the direction of the arrow of FIG. 8A. The inner surface g810A of the glass plate g810 may be, for example, a surface of the glass plate g810 formed in the direction opposite to that of the arrow of FIG. 8A. The definition of the inner surface g810A and the outer surface g810B of the glass plate g810 in FIG. 8A may be the same as those in FIGS. 8B and 8C.

Figure 8B:
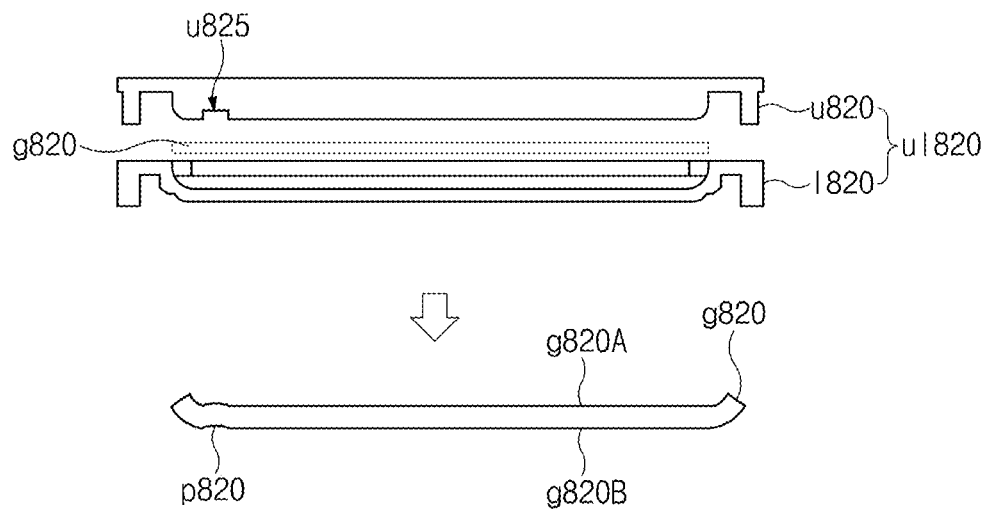
FIG. 8B illustrates a second mold set having an upper run-out groove and a glass plate formed by the second mold set, according to an embodiment of the present disclosure.

FIG. 8B illustrates a second mold set and a glass plate according to an embodiment of the present disclosure. The second mold set may be, for example, a mold set having an upper run-out groove.

Referring to FIG. 8B, according to an embodiment, a second mold set ul820 may include an upper mold u820 and a lower mold l820. The upper mold u820 may have a run-out groove u825 formed on an inner surface thereof, and the lower mold l820 may have no run-out groove formed thereon. For example, the run-out groove u825 may be formed on the inner surface of the upper mold u820 that corresponds to an inner surface g820A of a first portion p820 of a glass plate g820. The run-out groove u825 may face the inner surface g820A of the first portion p820 of the glass plate g820 in a hot forming process for the glass plate g820. Due to the run-out groove u825 of the upper mold u820, the inner surface of the first portion p820 of the glass plate g820 may not make direct contact with the upper mold u820, or the area or pressure by which the first portion p820 makes contact with the upper mold u820 may be smaller than when the run-out groove u825 is not present.

According to an embodiment, the first portion p820 of the glass plate g820, which is formed by using the second mold set ul820, may have a protruding shape protruding from the inner surface g820A of the glass plate g820 and recessed inward from an outer surface g820B of the glass plate g820.

Figure 8C:
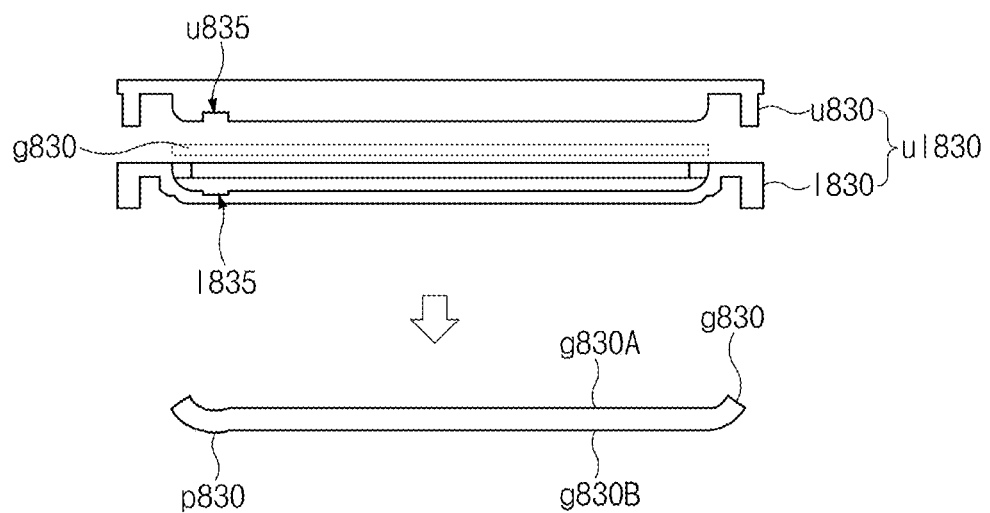
FIG. 8C illustrates a third mold set having upper and lower run-out grooves and a glass plate formed by the third mold set, according to an embodiment of the present disclosure.

FIG. 8C illustrates a third mold set and a glass plate according to an embodiment of the present disclosure. The third mold set may be, for example, a mold set having upper and lower run-out grooves.

Referring to FIG. 8C, according to an embodiment, a third mold set ul830 may include an upper mold u830 and a lower mold l830. The upper mold u830 may have a first run-out groove u835 formed on an inner surface thereof, and the lower mold l830 may a second run-out groove l835 formed on an inner surface thereof. For example, the first run-out groove u835 may be formed on the inner surface of the upper mold u830 that corresponds to an inner surface g830A of a first portion p830 of a glass plate g830 that covers a camera hole (e.g., the camera hole c520 of FIG. 4). For example, the second run-out groove l835 may be formed on the inner surface of the lower mold l830 that corresponds to an outer surface g830B of the first portion p830 of the glass plate g830. In a hot forming process for the glass plate g830, the first run-out groove u835 may face the inner surface g830A of the first portion p830 of the glass plate g830, and the second run-out groove l835 may face the outer surface g830B of the first portion p830 of the glass plate g830. Due to the first run-out groove u835 and the second run-out groove l835, the inner surface g830A and the outer surface g830B of the first portion p830 of the glass plate g830 may not make direct contact with the upper mold u830 and the lower mold l830, or the area or pressure by which the first portion p830 makes contact with the upper mold u830 and the lower mold l830 may be smaller than when the first and second run-out grooves u835 and l835 are not present.

According to an embodiment, the first portion p830 of the glass plate g830, which is formed by using the third mold set ul830, may protrude toward the outer surface of the glass plate g830 according to the direction of pressure in the hot forming process. For example, the first portion p830 of the glass plate g830 may have a protruding shape recessed inward from the inner surface g830A of the glass plate g830 and protruding from the outer surface g830B of the glass plate g830. According to an embodiment, in the case where the run-out grooves u835 and l835 are formed in both the upper mold u830 and the lower mold l830 for a hot forming process, the shape of the first portion p830 (the protruding direction) of the glass plate g830 may correspond to the direction of pressure applied in the hot forming process.

Since the mold set for a hot forming process, according to an embodiment, is formed such that at least one of the outer surface g830B and the inner surface g830A of the first portion p830 of the glass plate g830 does not make contact with the molds or has less contact with the molds, it is possible to reduce an extent to which a glass defect (e.g., scratch) is generated on the first portion p830 of the glass plate g830.

Figure 9:
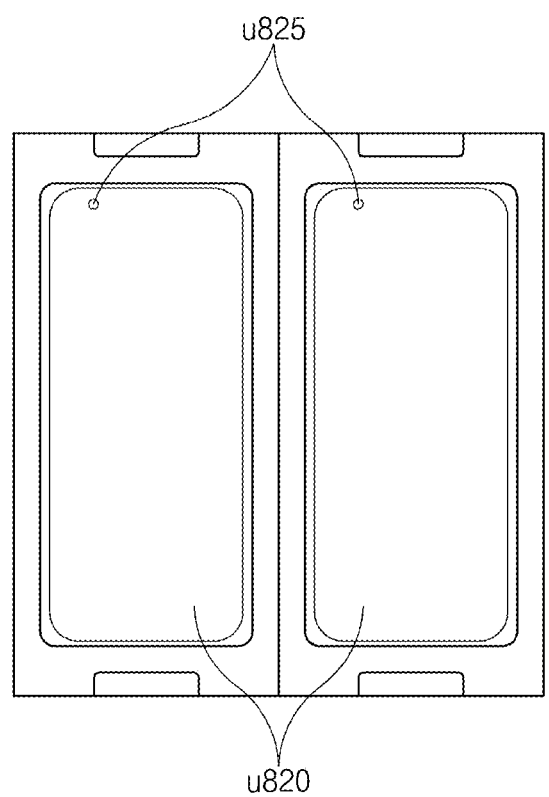
FIG. 9 illustrates an upper mold for performing a hot forming process on a plurality of glass plates at one time, according to an embodiment of the present disclosure.

FIG. 9 illustrates an upper mold for performing a hot forming process on a plurality of glass plates at one time, according to an embodiment of the present disclosure.

Referring to FIG. 9, according to an embodiment, an upper mold u820 may be configured to perform a hot forming process on a plurality of glass plates (e.g., g820 of FIG. 8b) at one time. FIG. 9 illustrates the upper mold u820 that is capable of performing a hot forming process on two glass plates g820 at one time. In this case, a lower mold (e.g., l820 of FIG. 8b) may be formed to correspond to the upper mold u820.

Figure 10:
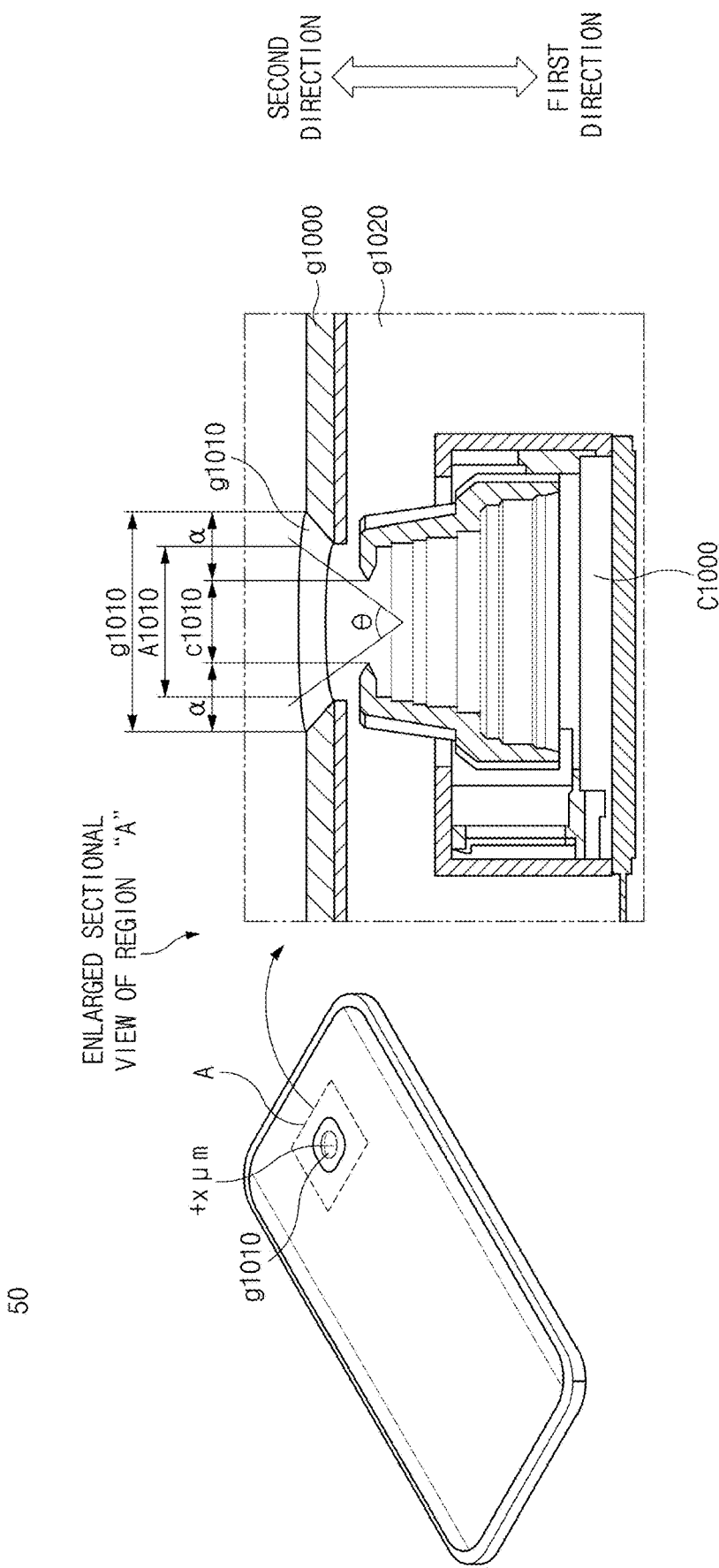
FIG. 10 illustrates an electronic device having a glass plate on a rear side thereof, according to an embodiment of the present disclosure.

FIG. 10 illustrates an electronic device having a glass plate on a rear side thereof, according to an embodiment of the present disclosure. In FIG. 10, region A (a region shown by a dotted line) may be a rear camera region of the electronic device, and an enlarged sectional view of region A may be a detailed sectional view taken along a line vertically passing through the center of region A. Hereinafter, a description of the same element as, or an element similar to, the glass plate constituting the front side of the electronic device, which has been described above with reference to FIGS. 4 and 5, will be omitted, and the following description will be focused on non-redundant elements.

Referring to FIG. 10, according to an embodiment, the electronic device 50 may include a rear camera c1000 and a rear glass plate g1000.

According to an embodiment, at least a portion of the rear camera c1000 may be exposed outside the electronic device 50 through a first portion g1010 of the rear glass plate g1000. For example, at least a portion of a camera hole (or a camera assembly hole) c1010 of the rear glass plate g1000 may be exposed through the first portion g1010. In the case where the rear glass plate g1000 is a curved glass plate, the first portion g1010 may be located, for example, in a flat region of the rear glass plate g1000.

According to an embodiment, at least one of an outer surface and an inner surface of the rear glass plate g1000 may include a protrusion formed on the first portion g1010. A first direction may be, for example, a direction from the rear side to the front side of the electronic device 50 of FIG. 10. A second direction may be a direction opposite to the first direction. For example, the protrusion may be formed in the direction from the inner surface to the outer surface of the rear glass plate g1000 (or by a pressing force applied to the rear glass plate g1000 in the second direction) in a hot forming process for the rear glass plate g1000. The first portion g1010 of the rear glass plate g1000 may include, for example, a protrusion formed such that the inner surface of the rear glass plate g1000 is recessed in the second direction and the outer surface of the rear glass plate g1000 protrudes in the second direction.

For example, the protrusion may have a convex cross-section having a height (+x) ranging from a first value (e.g., 0.5 μm) to a second value (e.g., 3 μm) in the second direction from the outer surface of the rear glass plate g1000 around the first portion g1010. The inner surface of the rear glass plate g1000 may have a recess formed on the first portion g1010 of the rear glass plate g1000 in the second direction. For example, the recess may have a concave cross-section having a depth ranging from the first value to the second value in the second direction from the inner surface around the first portion g1010.

In an embodiment, the first portion g1010 of the rear glass plate g1000 may include the camera hole c1010 when viewed from above the outer surface of the rear glass plate g1000. For example, in the case where the first portion g1010 of the rear glass plate g1000 has a circular shape, the diameter of the first portion g1010 of the rear glass plate g1000 may be larger than the diameter of the rear camera hole c1010 by at least a specified distance α. For example, the specified distance α may be set such that the width of the first portion g1010 is larger than the width of a first region A1010 of the rear camera c1000. The first region A1010 may be, for example, a virtual region (see a triangle) generated when the angle of view of the rear camera c1000 and the inner surface of the rear glass plate g1000 cross each other. The first region A1010 may be, for example, a virtual region generated when the angle of view (θ) of the rear camera c1000 and the inner or outer surface of the glass plate g1000 cross each other. For example, if the first region A1010, which is formed by points where lines representing the angle of view of the rear camera c1000 intersect the outer surface of the rear glass plate g1000, has a circular shape with 3.48φ, the first portion g1010 of the rear glass plate g1000 may have 4.5φ larger than the diameter of the first region A1010 by 0.72 mm.

According to an embodiment, a second portion g1020 of the rear glass plate g1000 may be configured to cover an internal element (e.g., the processor) of the electronic device 50. For example, the second portion g1020 of the rear glass plate g1000 may have an opaque layer attached thereto or coated thereon. The second portion g1020 of the rear glass plate g1000 may have different transparency from the first portion g1010.

In the embodiment of FIG. 10, the rear glass plate g1000 has been described in which the outer surface of the first portion 1010 of the rear glass plate g1000 is convex (or protrudes) in the second direction and the inner surface of the first portion g1010 of the rear glass plate g1000 is recessed in the second direction. In another example, the rear glass plate g1000 may be formed such that the inner surface of the first portion g1010 of the rear glass plate g1000 protrudes in the first direction and the outer surface of the first portion g1010 of the rear glass plate g1010 is recessed in the first direction.

Figure 11:
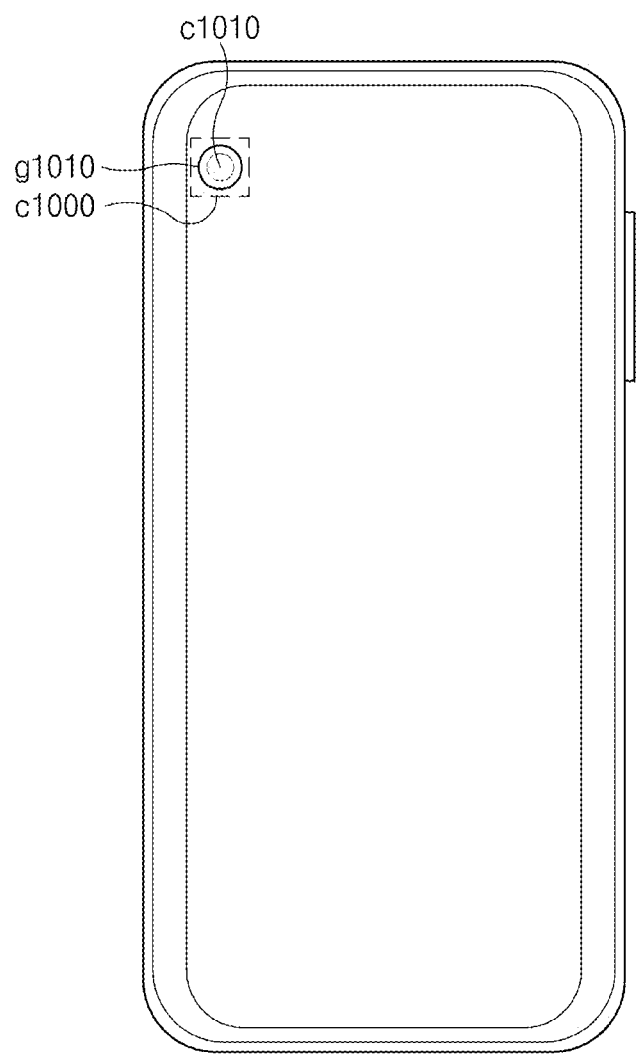
FIG. 11 illustrates an electronic device having a rear camera on a corner of a rear side thereof, according to an embodiment of the present disclosure.

FIG. 11 illustrates an electronic device having a rear camera on a corner of a rear side thereof, according to an embodiment of the present disclosure.

Referring to FIG. 11, according to an embodiment, the rear camera c1000 (or a front camera) may be located on at least one corner (e.g., an upper left corner) of the rear side (or the front side) of the electronic device 50. In this case, the first portion g1010 of the rear glass plate g1000 may be formed in a region corresponding to the rear camera hole c1010 to expose at least a portion of the rear camera hole c1010 (or a front camera hole). According to various embodiments, the rear camera c1000 (or the front camera) may be located on a central region or an upper/lower central region of the rear side (or the front side) of the electronic device 50.

Figure 12:
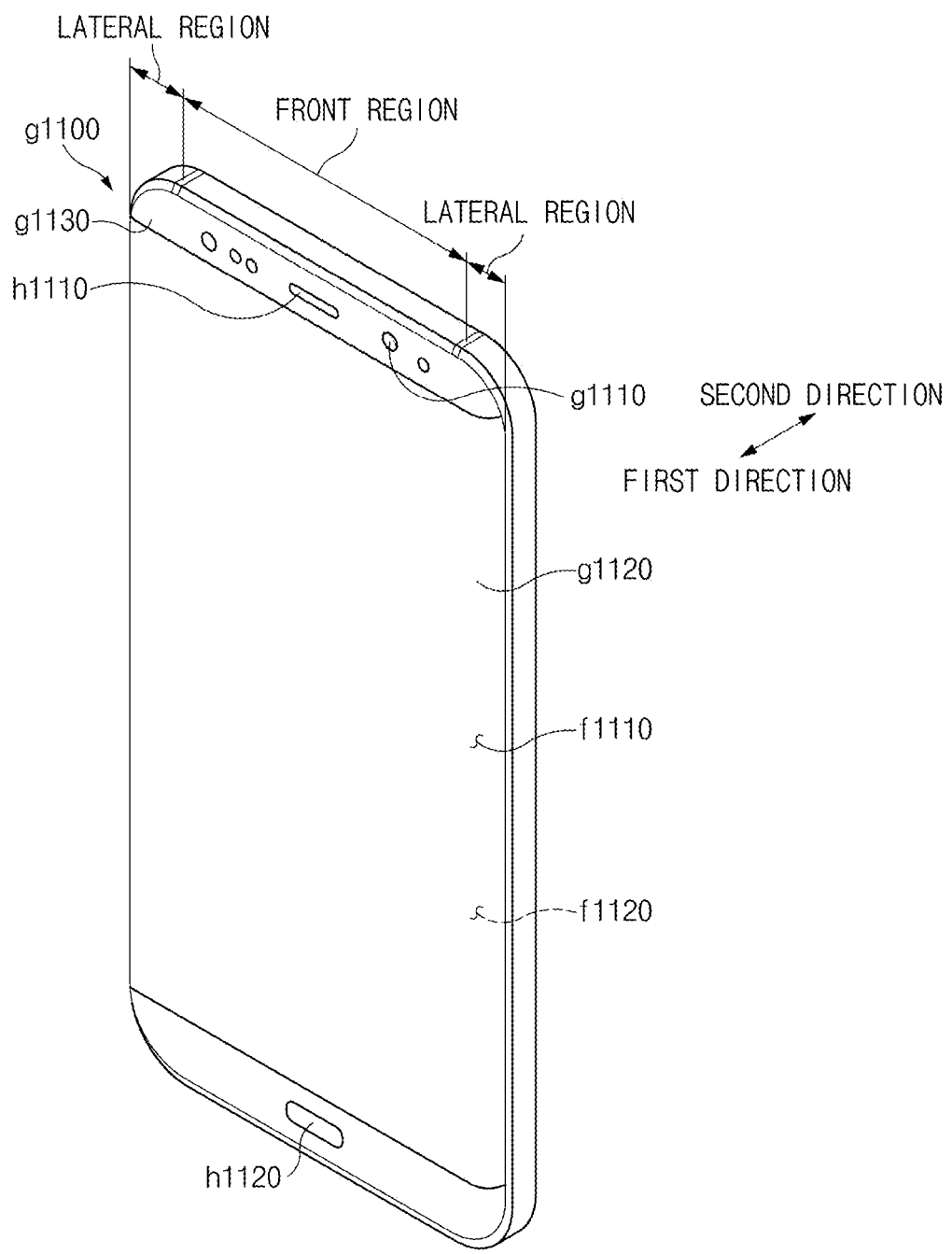
FIG. 12 illustrates a perspective view of a glass plate according to an embodiment of the present disclosure.

FIG. 12 is a perspective view of a glass plate according to an embodiment of the present disclosure.

Referring to FIG. 12, according to an embodiment, a glass plate g1100 may form more than half of one side of the electronic device 50. The one side of the electronic device (e.g., the electronic device 50 of FIG. 10) may include at least one of the front side and the rear side of the electronic device 50. A camera hole (e.g., c520 of FIG. 4) of a camera through which external light is input may be exposed through the one side of the electronic device 50. In FIG. 12, for the convenience of description, it will be exemplified that the glass plate g1100 substantially forms the front side of the electronic device 50.

According to an embodiment, the glass plate g1100 may include an outer surface f1110 and an inner surface f1120. The outer surface f1110 may face a first direction, and the inner surface f1120 may face a second direction opposite to the first direction. The first direction may be, for example, a direction from the front side of the electronic device 50 to the outside when the glass plate g1100 is mounted on the electronic device 50. The second direction may be, for example, a direction from the rear side of the electronic device 50 to the outside when the glass plate g1100 is mounted on the electronic device 50. A first portion g1110 of at least one of the outer surface f1110 and the inner surface f1120 may have a different curvature from a peripheral portion around the first portion g1110. The first portion g1110 may be, for example, a portion of the glass plate g1100 through which at least a portion of the camera hole is exposed. According to an embodiment, at least one of the outer surface f1110 and the inner surface f1120 of the glass plate g1100 may have different curvatures in the first portion g1110 and the peripheral portion around the first portion g1100. The first portion g1110 of the glass plate g1100 may have at least one of a protrusion protruding in the first or second direction, a depression recessed inward from the outer surface f1110 in the second direction, and a depression recessed inward from the inner surface f1120 in the first direction.

According to an embodiment, at least one of the outer surface f1110 and the inner surface f1120 may have a protrusion on the first portion g1110. For example, the protrusion may be formed by a pressing force applied to the inner surface f1120 of the glass plate g1100 in the first direction.

According to an embodiment, the protrusion may be spaced a specified distance apart from a corner of the glass plate g1100 when viewed from above the outer surface f1110 of the glass plate g1100. The specified distance may be, for example, a distance corresponding to the position of the camera hole. Since the first portion g1110 of the glass plate g1100 is spaced the specified distance apart from the corner of the glass plate g1100, the first portion g1110 of the glass plate g1100 may be located in a flat region of the glass plate g1100.

According to an embodiment, the protrusion may have a convex cross-section having a height ranging from a first value to a second value in the second direction from the inner surface around the first portion g1110, or may have a convex cross-section having a height ranging from the first value to the second value in the first direction from the outer surface around the first portion g1110.

According to an embodiment, the glass plate g1100 may have a recess formed on the first portion g1110. The recess may have a concave cross-section having a depth ranging from the first value to the second value in the second direction from the outer surface around the first portion g1110, or may have a concave cross-section having a depth ranging from the first value to the second value in the first direction from the inner surface around the first portion g1110.

According to an embodiment, the outer surface f1110 and the inner surface f1120 of the glass plate g1100 may include a flat region and a curved region. The first portion g1110 of the glass plate g1100 may be formed in the flat region.

According to an embodiment, since the glass plate g1100 is formed of a transparent material (e.g., glass, a transparent synthetic resin, or the like), at least a part of internal elements of the electronic device 50 may be exposed through the glass plate g1100. For example, a second portion g1120 of the glass plate g1100 may remain transparent to expose a display (e.g., d500 of FIG. 4) of the electronic device 50.

According to an embodiment, the glass plate g1100 may include one or more holes h1110 and h1120. At least some of the internal elements of the electronic device 50 may be exposed through the one or more holes h1120 and h1120. For example, the one or more holes h1120 and h1120 may include the first hole h1120 for exposing an output unit of a speaker and the second hole h1120 for exposing a home button.

According to an embodiment, a third portion g1130 of the glass plate g1100 may include an opaque layer coated thereon or attached thereto. The opaque layer may not be formed on the first portion g1110 and the second portion g1120 of the glass plate g1100.

The glass plate g1100 according to an embodiment may be formed by performing a hot forming process in the state in which a region where at least transparency has to be ensured (e.g., a region corresponding to the camera hole) does not make contact with a mold or has less contact with the mold. Accordingly, the glass plate g1100 according to an embodiment may reduce a glass defect (e.g., scratch) on a specified region thereof.

An electronic device (see the number 50 of FIG. 4) includes a front plate (see the number f500 of FIG. 4) including a glass plate (see the number g500 of FIG. 4), the glass plate including an outer surface facing a first direction and an inner surface facing a second direction opposite to the first direction; a rear plate (see the number r500 of FIG. 4) including an external surface facing the second direction; a side member configured to surround a space between the front plate and the rear plate, the side member (see the number s500 of FIG. 4) being integrally formed with, or attached to, the rear plate; an imaging device (see the number c500 of FIG. 4) exposed through a first portion of the front plate; and a display (see the number d500 of FIG. 4) exposed through a second portion (see the number g530 of FIG. 5) of the front plate when viewed from above the outer surface, wherein the first portion (see the number g510 of FIG. 4) is located between the second portion and the side member when viewed from above the outer surface, and wherein the glass plate includes, on the first portion, at least one of a first protrusion protruding from the outer surface in the first direction and a second protrusion protruding from the inner surface in the second direction.

The first protrusion has a convex cross-section having a height ranging from 0.5 µm to 3 µm in the first direction from the outer surface around the first portion.

The inner surface of the glass plate has, on the first portion, a recess formed in the first direction.

The recess has a concave cross-section having a depth ranging from 0.5 µm to 3 µm in the first direction from the inner surface around the first portion.

At least one of the outer surface and the inner surface of the glass plate has no repeated pattern on the first portion and has a repeated pattern outside the first portion.

An electronic device (see the number 50 of FIG. 10) includes a glass plate (see the number g1000 of FIG. 5) configured to form more than half of one side of the electronic device; and a camera (see the number c1000 of FIG. 5) disposed below the glass plate. The glass plate includes an outer surface facing a first direction; and an inner surface facing a second direction opposite to the first direction, and wherein at least one of the outer surface and the inner surface has a first portion through which at least a part of lenses of the camera is exposed, the first portion having a different curvature from a peripheral portion around the first portion.

The glass plate includes a flat region (see the flat region FIG. 12); and a curved region (see the curved region FIG. 12) connecting to at least one side of the flat region, and wherein the first portion is formed in at least a portion of the flat region.

The glass plate is disposed on at least one of a front side of the electronic device and a rear side of the electronic device.

The electronic device further includes a display (see the number d500 of FIG. 5), wherein at least a portion of the display is exposed through a second portion (see the number g1120 of FIG. 12) of the glass plate when the glass plate forms a front side of the electronic device, wherein the glass plate includes an opaque layer coated on or attached to a third portion (see the number g1130 of FIG. 12) of the glass plate, and wherein the third portion has different transparency from the first portion and the second portion.

The first portion has an area larger in size than the at least a part of the lenses of the camera.

The first portion has an area larger than an area of a virtual region generated when an angle of view of the camera and the inner surface or the outer surface of the glass plate cross each other.

The first portion has at least one of a protrusion protruding in the first direction or the second direction, a depression recessed inward from the outer surface in the second direction, and a depression recessed inward from the inner surface in the first direction.

A glass plate forming more than half of one side of an electronic device that includes a camera, the glass plate (see the number g810 of FIG. 8*a*) includes an outer surface (see the number g810B of FIG. 8*a*) facing a first direction; and an inner surface (see the number g810A of FIG. 8*a*) facing a second direction opposite to the first direction, wherein at least one of the outer surface and the inner surface has a first portion (see the number p810 of FIG. 8*a*) through which at least a part of lenses of the camera is exposed, the first portion having a different curvature from a peripheral portion around the first portion.

The first portion is formed to have the different curvature from the peripheral portion by a pressing force applied to the inner surface of the glass plate in the first direction.

The outer surface and the inner surface include a flat region and a curved region, and wherein the first portion is formed in the flat region.

The glass plate further includes an opaque layer coated on or attached to a second portion of the glass plate, wherein the opaque layer has different transparency from another portion of the glass plate.

The first portion is spaced a specified distance apart from the outermost position of the glass plate when viewed from above the outer surface of the glass plate.

The glass plate further includes a protrusion on the first portion, wherein the protrusion having a convex cross-section having a height ranging from 0.5 µm to 3 µm in the first direction from the outer surface around the first portion or a convex cross-section having a height ranging from 0.5 µm to 3 µm in the second direction from the inner surface around the first portion.

The outer surface of the glass plate has a recess formed on an outer surface or an inner surface of the first portion in the second direction.

The first portion has at least one of a protrusion (see the number p810 of FIG. 8a) or (see the number p820 of FIG. 8b) protruding in the first direction or the second direction, a depression (see the number p820 of FIG. 8b) recessed inward from the outer surface in the second direction, and a depression (see the number p810 of FIG. 8a) or recessed inward from the inner surface in the first direction.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a front plate including a glass plate, the glass plate including an outer surface facing a first direction and an inner surface facing a second direction opposite to the first direction;
   a rear plate including an external surface facing the second direction;
   a side member configured to surround a space between the front plate and the rear plate, the side member being integrally formed with, or attached to, the rear plate;
   an imaging device exposed through a first portion of the front plate; and
   a display exposed through a second portion of the front plate when viewed from above the outer surface,
   wherein the first portion is located between the second portion and the side member when viewed from above the outer surface,
   wherein the glass plate includes, on the first portion, a protrusion protruding from the outer surface in the first direction and a recess formed from the inner surface in the first direction,
   wherein a convex cross-section having a first height that protrudes in the first direction is formed on the outer surface of the first portion of the glass plate,
   wherein a concave cross-section having a first depth corresponding to the first height that is recessed in the first direction is formed on the inner surface of the first portion of the glass plate, and
   wherein a thickness of the first portion of the glass plate is substantially identical to a thickness of a rest of a portion of the glass plate except the first portion.

2. The electronic device of claim 1, wherein the first height ranges from 0.5 μm to 3 μm in the first direction from the outer surface around the first portion.

3. The electronic device of claim 1, wherein the first depth ranges from 0.5 μm to 3 μm in the first direction from the inner surface around the first portion.

4. The electronic device of claim 1, wherein at least one of the outer surface and the inner surface of the glass plate includes no repeated pattern on the first portion and a repeated pattern outside the first portion.

5. An electronic device comprising:
   a glass plate configured to form at least half of one side of the electronic device; and
   a camera disposed below the glass plate,
   wherein the glass plate includes:
   an outer surface facing a first direction; and
   an inner surface facing a second direction opposite to the first direction, and
   wherein at least one of the outer surface and the inner surface includes a first portion where at least a part of a lens of the camera is exposed, and the first portion includes a different curvature from a peripheral portion around the first portion,
   wherein a convex cross-section having a first height that protrudes in the first direction is formed on the outer surface of the first portion of the glass plate,
   wherein a concave cross-section having a first depth corresponding to the first height that is recessed in the first direction is formed on the inner surface of the first portion of the glass plate, and
   wherein a thickness of the first portion of the glass plate is substantially identical to a thickness of a rest of a portion of the glass plate except the first portion.

6. The electronic device of claim 5, wherein the glass plate includes:
   a flat region; and
   a curved region connecting to at least one side of the flat region, and
   wherein the first portion is formed in at least a portion of the flat region.

7. The electronic device of claim 5, wherein the glass plate is disposed on at least one of a front side of the electronic device and a rear side of the electronic device.

8. The electronic device of claim 5, further comprising:
   a display,
   wherein at least a portion of the display is exposed through a second portion of the glass plate when the glass plate forms a front side of the electronic device,
   wherein the glass plate includes an opaque layer coated on or attached to a third portion of the glass plate, and
   wherein the third portion includes a different transparency from the first portion and the second portion.

9. The electronic device of claim 5, wherein the first portion includes an area larger in size than the at least a part of the lens of the camera.

10. The electronic device of claim 5, wherein the first portion includes an area larger than an area of a virtual region generated when a first angle determined by view of the camera and the inner surface or the outer surface of the glass plate cross each other.

11. A glass plate forming at least half of one side of an electronic device that includes a camera, the glass plate comprising:
    an outer surface facing a first direction; and
    an inner surface facing a second direction opposite to the first direction,
    wherein at least one of the outer surface and the inner surface includes a first portion where at least a part of a lens of the camera is exposed, and the first portion includes a different curvature from a peripheral portion around the first portion,
    wherein a convex cross-section having a first height that protrudes in the first direction is formed on the outer surface of the first portion of the glass plate,
    wherein a concave cross-section having a first depth corresponding to the first height that is recessed in the first direction is formed on the inner surface of the first portion of the glass plate, and
    wherein a thickness of the first portion of the glass plate is substantially identical to a thickness of a rest of a portion of the glass plate except the first portion.

12. The glass plate of claim 11, wherein the first portion is formed to include the different curvature from the peripheral portion by a pressing force applied to the inner surface of the glass plate in the first direction.

13. The glass plate of claim 11, wherein the outer surface and the inner surface include a flat region and a curved region, and
wherein the first portion is formed in the flat region.

14. The glass plate of claim 11, further comprising:
an opaque layer coated on or attached to a second portion of the glass plate,
wherein the opaque layer includes a different transparency from another portion of the glass plate.

15. The glass plate of claim 11, wherein the first portion is spaced a specified distance apart from an outermost position of the glass plate when viewed from above the outer surface of the glass plate.

16. The glass plate of claim 11,
wherein the first height ranges from 0.5 μm to 3 μm in the first direction from the outer surface around the first portion a first depth ranges from 0.5 μm to 3 μm in the first direction from the inner surface around the first portion.

* * * * *